UNITED STATES PATENT OFFICE.

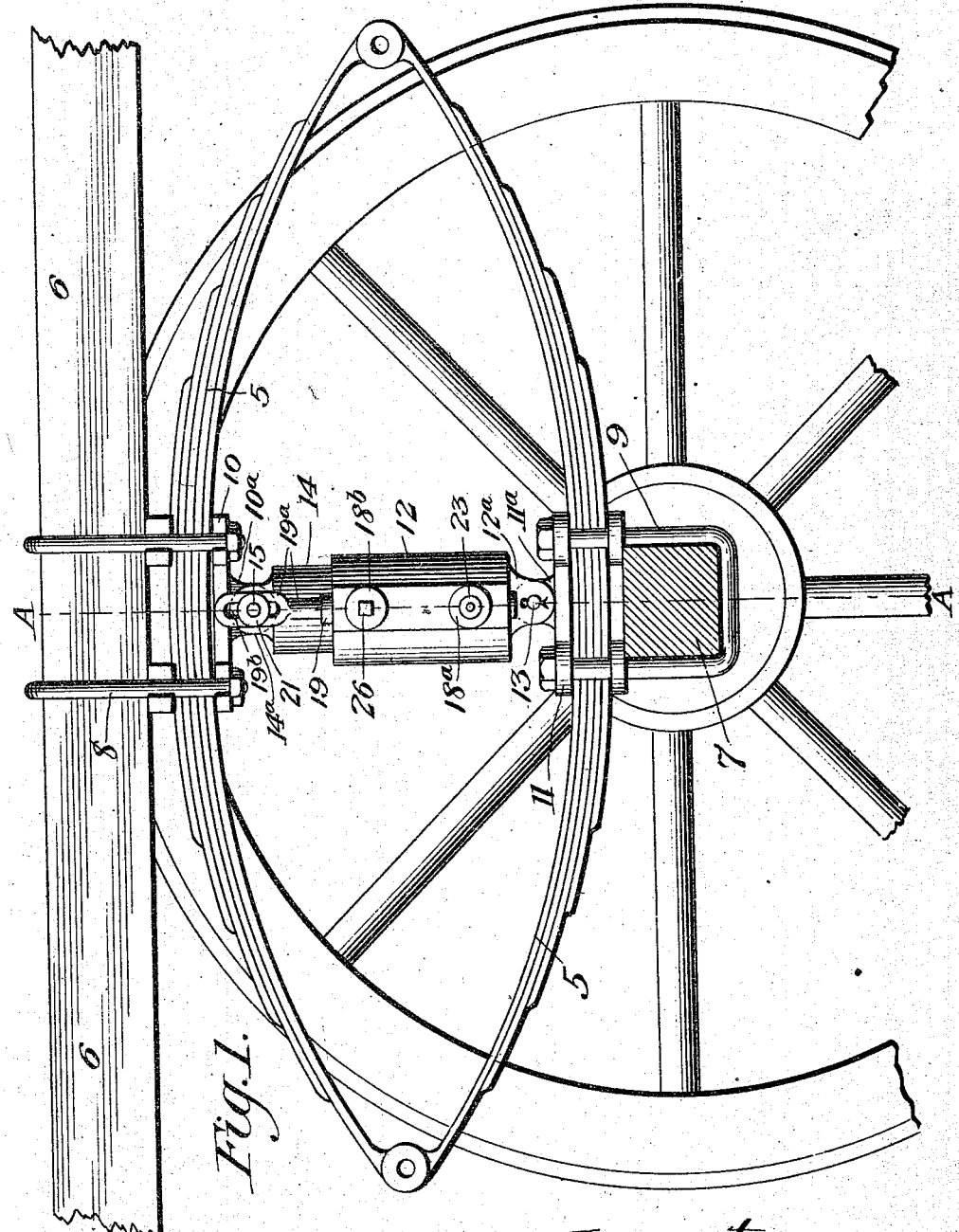

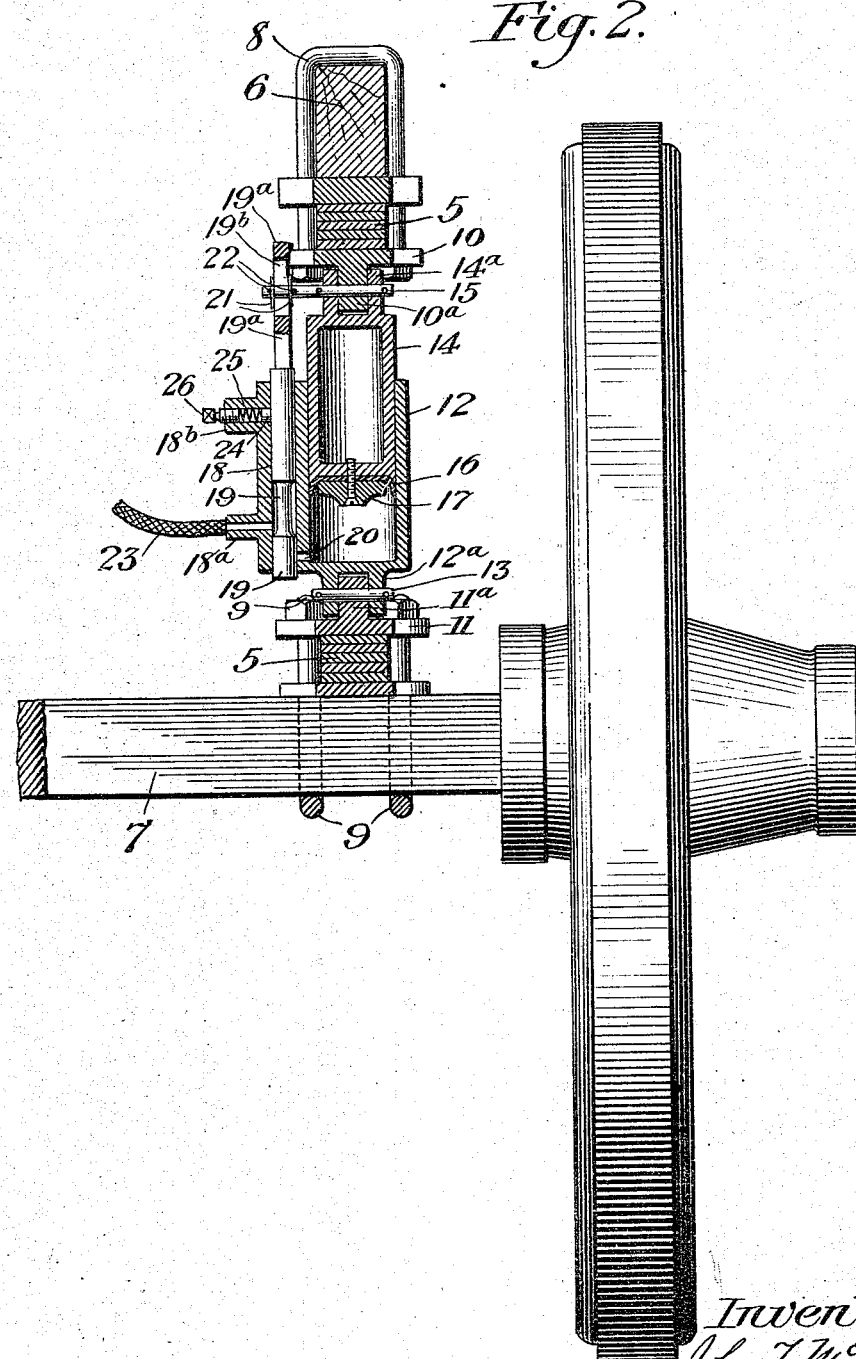

JOHN THOMAS McCROSSON, OF HONOLULU, TERRITORY OF HAWAII.

PNEUMATIC LOAD-COMPENSATOR FOR MOTOR-DRIVEN VEHICLES.

1,179,015.  Specification of Letters Patent.  Patented Apr. 11, 1916.

Application filed March 27, 1915. Serial No. 17,343.

*To all whom it may concern:*

Be it known that I, JOHN THOMAS Mc-CROSSON, a citizen of the United States, residing at Honolulu, in the county of Honolulu and Territory of Hawaii, have invented certain new and useful Improvements in Pneumatic Load-Compensators for Motor-Driven Vehicles; and I do hereby declare the following to be a full, clear, and exact description of the invention, such as will enable others skilled in the art to which it appertains to make and use the same.

This invention relates to improvements in motor-driven trucks or automobiles for freight or passengers, its object being to provide means for automatically compensating for the load on such a vehicle, so that its springs are maintained in their normal working position independently of the load.

The invention contemplates pneumatic load compensating means interposed between the axle or axles and the body or the frame of the motor-driven vehicle. When a load is applied to the vehicle its springs are compressed, compressed air is then automatically admitted to the cylinders of the load compensators until the pressure on their pistons is sufficient to raise the frame or body of the truck and cause the springs of the vehicle to return to their normal working position, whereupon the supply of compressed air is automatically cut off. The air under pressure now in these cylinders acts, together with the springs, to cushion the shocks occasioned when the vehicle is traveling over an uneven surface. When the load or a part of the load is removed from the vehicle, air is automatically permitted to escape from these cylinders, thus lowering the pressure of the same on the pistons, until the springs again assume their normal working positions under the new load conditions. The springs of the motor-driven vehicle are thus always maintained in their normal working position irrespective of any changes made in the load upon the vehicle.

The invention consists in providing such pneumatic means for automatically compensating for the loads on the vehicle in an efficient and economical manner.

In the accompanying drawing, forming a part of this specification, Figure 1 represents an inside elevation of a portion of a motor-driven truck illustrating one embodiment of my invention. Fig. 2 represents a vertical sectional view on the line A—A of Fig. 1.

Referring to the drawing, the elliptical leaf spring 5 is secured between the frame 6 and the axle 7 of the vehicle by the U-bolts 8 and 9 passing through holes in the plates 10 and 11 respectively. The cylinder 12 is hinged above the plate 11 by the pin 13, which passes through the ears 12ª on the bottom of said cylinder and through the lug 11ª on the plate 11. The piston 14, adapted to slide in the cylinder 12, is similarly hinged to the plate 10 by the pin 15, which passes through the ears 14ª on the upper end of said piston and through the lug 10ª on the plate 10. A leather or other suitable crimp 16 is secured between the lower end of the piston 14 and the follower or clamp plate 17.

The valve chamber 18, which is adjacent to the cylinder 12 and may be cast integral therewith, is provided with the piston-valve 19 adapted to slide vertically in said chamber. The opening of port 20 connects the interior of the cylinder 12 with the valve chamber 18, said port being near the bottom of said cylinder. The valve-rod 19ª of the piston-valve 19 is provided with an elongated hole 19ᵇ. The hinge pin 15 is extended and passes through this hole 19ᵇ, and a washer 21 is placed on said pin on each side of the valve-rod 19ª, these washers being retained in place by the cotter-pins 22. Compressed air may be admitted to the valve chamber 18, from any suitable source on the vehicle, by means of the flexible pipe 23 connected to the nozzle 18ª. A brake may be applied to the piston-valve 19, to prevent any improper movement of said valve, for example, by means of the friction block 24 pressed against the piston-valve 19 by the spring 25 interposed between said friction block and the screw 26 in the boss 18ᵇ on the chamber 18, as shown.

While the pneumatic load compensator above described and illustrated in the drawing is confined to one spring of the vehicle, it is of course contemplated that the other spring or springs is or are to be similarly provided.

In operation, the piston 14 slides in the cylinder 12 with the movement of the spring 5 which operates in the usual manner. When a load is applied to the vehicle upon the frame 6 the spring 5 is compressed, and if sufficient load is added the pin 15 engages the valve-rod 19ª at the lower end of the hole 19ᵇ and forces the piston-valve 19 downward, permitting compressed air supplied through the pipe 23 to be admitted through the port 20 into the cylinder 12. The pressure of the air thus admitted causes the piston 14 to rise in the cylinder 12 and lift the frame 6 with its load, until the pin 15 has engaged the rod 19ᵃ at the upper end of the hole 19ᵇ and raised the piston-valve 19 sufficiently to again close the port 20 and shut off the supply of compressed air to the cylinder 12. The spring 5 is now back in its normal working position, the weight of the added load on the vehicle being compensated for by the pressure of the air on the piston 14, and the spring 5 is free to work within fixed limits without any movement of the piston-valve 19. When, however, the load is removed from the frame 6 this air pressure forces the piston 14 upward and the pin 15 lifts the piston-valve 19 until it uncovers the port 20 and permits air to escape to the atmosphere from the cylinder 12 until the pressure on the piston 14 is sufficiently lowered to permit said piston to descend and the piston-valve 19 again covers the port 20.

It will now be noted, that the pneumatic device described automatically compensates for any load on the vehicle, and that the springs are thus always maintained in their normal working position irrespective of any changes of load on the vehicle. Of course, if preferred, the device may be inverted from that shown and described, in which case the cylinder 12 would be hinged to the plate 10 and the piston 14 would be hinged to the plate 11.

I claim:

1. The combination with the chassis frame of a vehicle, the running gear and the springs interposed between the two, of pneumatic means for maintaining the springs in their normal working position irrespective of the load comprising a cylinder and a piston interposed between a part of the chassis frame and a part of the running gear, a piston valve associated with said cylinder and having a slotted connection with one of said parts which will permit limited relative movement between said parts without moving said piston valve, and at least one port in the cylinder wall to admit compressed air to and discharge it from the cylinder, said piston valve being designed to admit compressed air to the cylinder when the chassis frame moves toward the running gear and being designed to permit the compressed air to exhaust to the atmosphere when the chassis frame moves away from the running gear.

2. The combination with the chassis frame of a vehicle, the running gear and the springs interposed between the two, of pneumatic means for maintaining the springs in their normal working position irrespective of the load comprising a cylinder and a piston interposed between the chassis frame and the running gear, a piston valve associated with said cylinder and having a slotted connection with the chassis frame, and a single port in the cylinder wall to admit compressed air to and discharge it from the cylinder, said piston valve being designed to admit compressed air to the cylinder through said port when the chassis frame moves toward the running gear and being designed to permit compressed air to exhaust to the atmosphere through said port when the chassis frame moves away from the running gear.

In testimony whereof I affix my signature in presence of two witnesses.

JOHN THOMAS McCROSSON.

Witnesses:
ROBT. J. PRATT,
W. WEATHERBEE.